July 23, 1957
R. M. RILEY
2,799,960
ANIMATED DECOY
Filed March 18, 1954
2 Sheets-Sheet 1
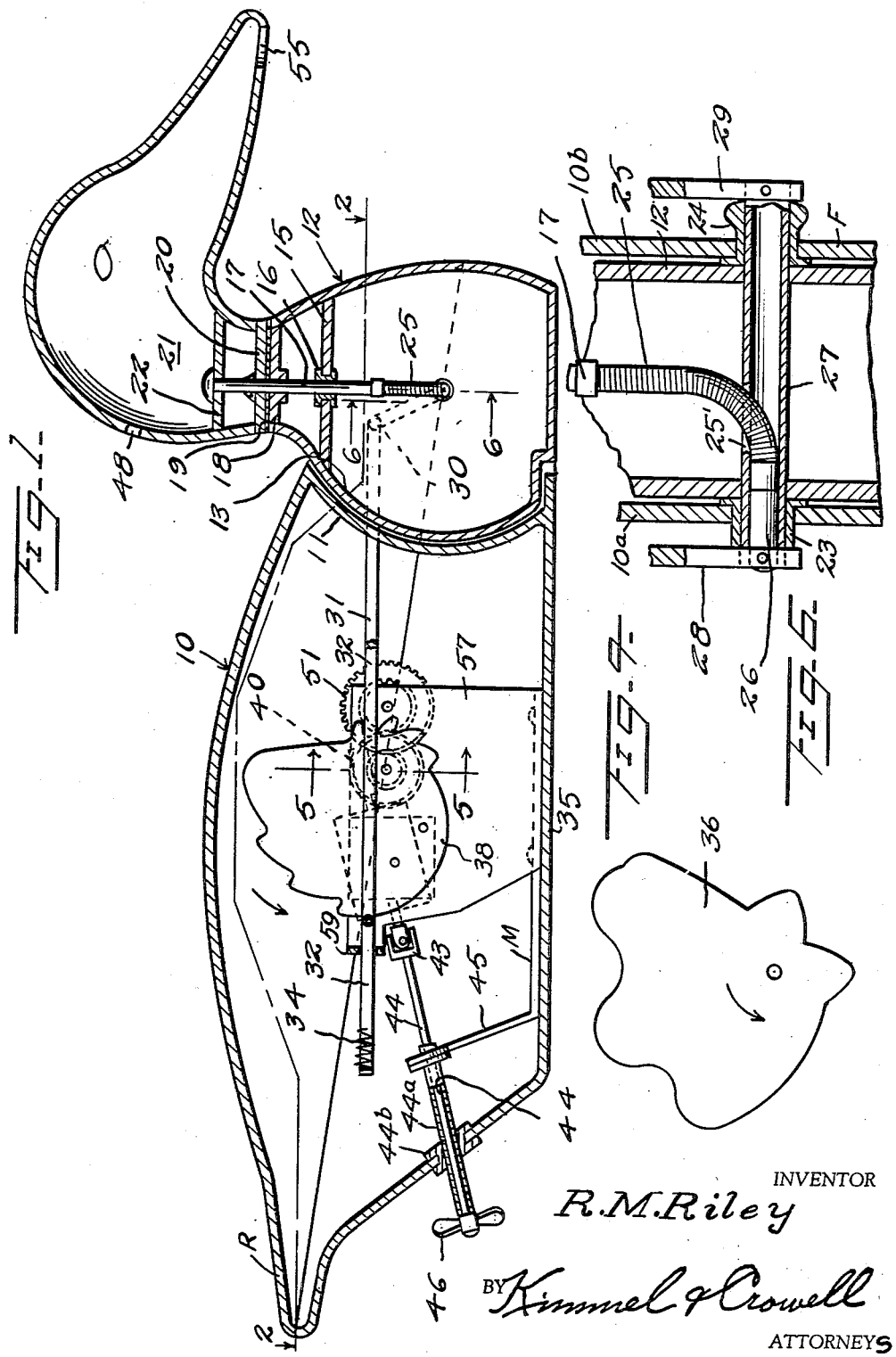
INVENTOR
R. M. Riley
BY Kimmel & Crowell
ATTORNEYS July 23, 1957
R. M. RILEY
2,799,960
ANIMATED DECOY
Filed March 18, 1954
2 Sheets-Sheet 2
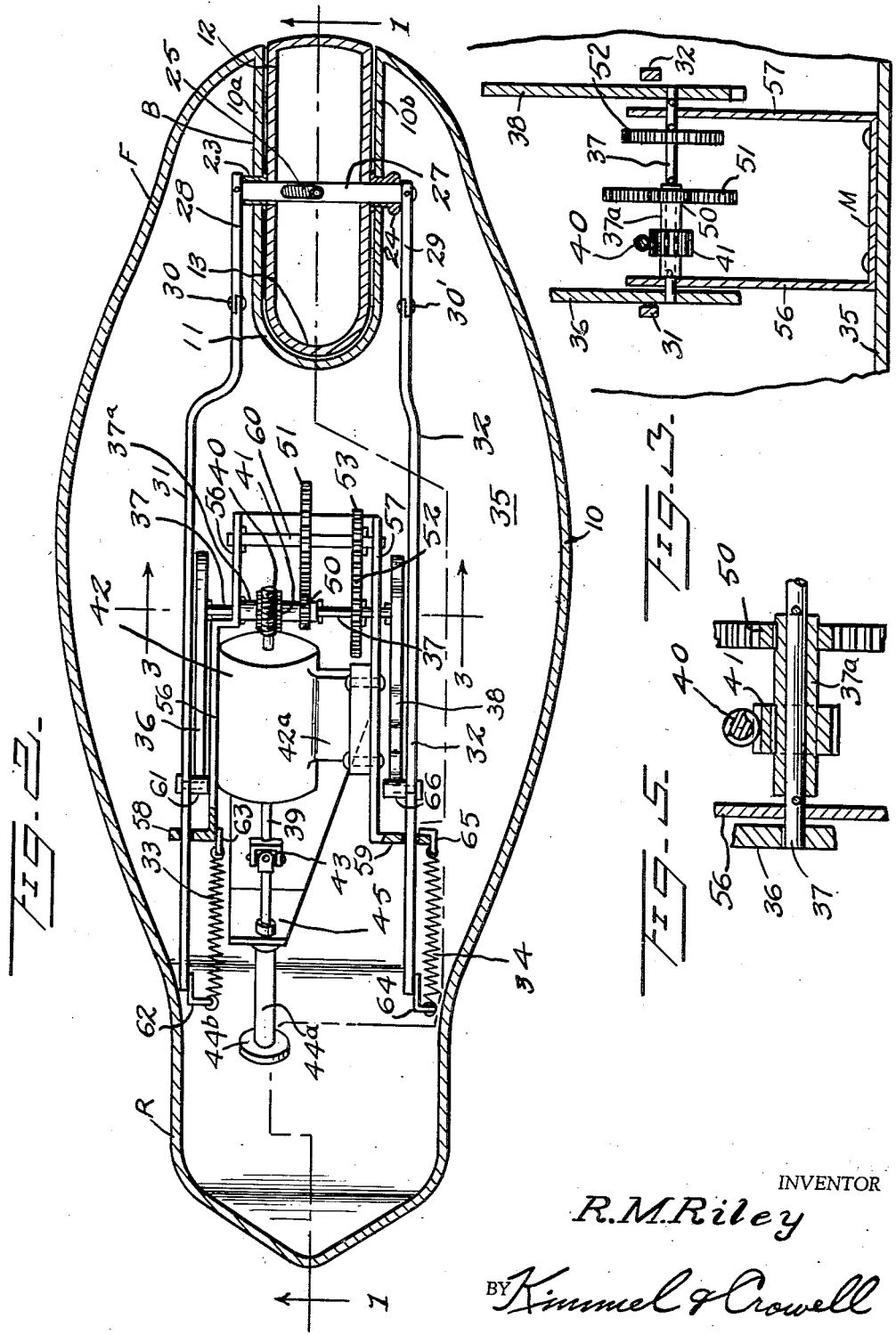
INVENTOR
*R. M. Riley*
BY *Kimmel & Crowell*
ATTORNEYS United States Patent Office 2,799,960
Patented July 23, 1957

2,799,960
ANIMATED DECOY
Robert M. Riley, Eugene, Oreg.
Application March 18, 1954, Serial No. 417,063
8 Claims. (Cl. 43—3)

This invention relates to a decoy, and more particularly to a decoy duck.

A primary object of this invention is the provision of a movable decoy which will substantially approximate the actual movements of a live water fowl, and consequently serve as a lure to other wild fowl.

A further object of the invention is the provision of such a device which will have animation to the extent of forward movement, and vertical pivoting of the head to simulate feeding under water as well as horizontal movement thereof.

Still another object of the invention is the provision of a device of this character which simulates in action a live water fowl in feeding.

Still other objects reside in the combination of elements, arrangement of parts, and features of construction, all as will be more fully pointed out hereinafter and shown in the accompanying drawings wherein there is disclosed a preferred embodiment of this inventive concept.

In the drawings:

Figure 1 is a vertical longitudinal sectional view of the decoy of the instant invention taken substantially along the line 1—1 of Figure 2, with parts omitted for convenience of illustration.

Figure 2 is a horizontal sectional view taken substantially along the line 2—2 of Figure 1, as viewed in the direction indicated by the arrows and disclosing certain constructional details.

Figure 3 is a sectional view taken substantially along the line 3—3 of Figure 2, as viewed in the direction indicated by the arrows.

Figure 4 is a plan view of one of the cam structures disclosed in Figure 2.

Figure 5 is a fragmentary enlarged vertical sectional view taken substantially along the line 5—5 of Figure 1, as viewed in the direction indicated by the arrows, with parts broken away and omitted for convenience of illustration.

Figure 6 is a sectional view taken substantially along the line 6—6 of Figure 1, as viewed in the direction indicated by the arrows.

Similar reference characters refer to similar parts throughout the several views of the drawings.

Having reference now to the drawings in detail, there is generally indicated at 10 a body in simulation of a duck or the like which may take the form of any selected wild fowl for which it is to be employed as a decoy.

The body 10 has a rear portion R and a forward portion F, as indicated in Figures 1 and 2. The body 10 is formed hollow and is provided with a vertical bifurcation or recess B at the forward end thereof, for reasons to be assigned. The vertical bifurcation B in the forward portion F of the body 10 includes a pair of spaced apart parallel walls 10a and 10b joined at their rear edges by arcuate wall 11, as shown in Figures 1 and 2.

A hollow neck 12 is formed to fit between the walls 10a and 10b and is provided with an arcuate rear portion 13 positioned in spaced parallel relation to the arcuate wall 11 in the body 10.

The side walls 10a and 10b of the forward portion F are provided with transversely aligned bushings 23 and 24 in which is journalled at opposite ends thereof a tubular shaft 27. The shaft 27 is rigidly secured to the neck 12 by any suitable means such as welding or the like so that the neck 12 may rotate vertically within the recess B of the body 10 about the axis of the shaft 27.

The neck 12 is provided with a transverse horizontal partition 15 having centrally disposed therein a water tight bushing 16, as shown in Figure 1. A shaft 17 is journalled in the water tight bushing 16 and extends upwardly through the top wall 18 of the neck 12 through the water proof washer 19 positioned on top of the top wall 18 and through the bottom wall 20 of a hollow decoy head 21 and through a transverse horizontal partition 22 spaced above the bottom wall 20. The bottom 20 of the head 21 is positioned in engagement with the water tight washer 19 and the partition 22 and the bottom wall 20 are secured to the shaft 17 by any suitable means such as welding or the like so that the head 21 will rotate with the shaft 17.

The head 21 is provided with vents 48 and 55 at opposed ends thereof to permit water to flow into the head 21 and air to flow outwardly therefrom during simulated feeding of the decoy 10.

A motor and transmission mount M is secured to the botom 35 of the body 10 by any suitable means such as welding or the like and includes a pair of parallel upright side walls 56 and 57, and an angularly upstanding rear wall 45. The upstanding walls 56 and 57 are each provided at their upper rear end portions with oppositely extending ears 58 and 59, as best shown in Figure 2.

An electric motor 42 is provided with a base 42a which is riveted to the side wall 57 securing the motor 42 to the mount M. The motor 42 has a shaft 39 extending outwardly from opposite ends thereof carrying on its forward end a worm gear 40 and on its rear end a universal joint 43.

A shaft 37 is journalled in the walls 56 and 57 with the opposite ends of the shaft 37 extending therebeyond. A cam plate 36 is fixed to one end of the shaft 37 adjacent the wall 56 and the cam plate 38 is secured to the other end of the shaft 37 adjacent the wall 57, as seen in Figures 2 and 3.

A tubular stub shaft 37a is journalled on the shaft 37 and carries fixed thereto a pinion gear 41 in cooperative engagement with the worm gear 40 and a pinion gear 50 spaced from the pinion gear 41. A shaft 60 is journalled in the side walls 56 and 57 forwardly of the shaft 37 and carries a gear 51 meshing with the pinion gear 50 and a second pinion gear 53 meshing with a gear 52 carried by the shaft 37 adjacent the side wall 57.

A sleeve 44a is positioned rearwardly of the mount M and extends through a bushing 44b in the body 10 and is supported at its forward end in the wall 45, as best shown in Figure 1. A propeller shaft 44 has its forward end secured to the universal joint 43 and extends through the sleeve 44a to the outside of the decoy 10 carrying a propeller 46 at the rear end portion thereof.

Referring now to Figure 6, a flexible cable 25 is secured to the lower end of the shaft 17 and extends through an opening 25' in the tubular shaft 27 and outwardly through the tubular shaft 27 beyond the end thereof supported in the bushing 23.

A crank arm 28 is secured to the end of the flexible cable 25 by means of a stub shaft 26 so that rotation of the crank arm 28 about the axis of the stub shaft 26 will rotate the flexible cable 25 and the shaft 17. A crank arm 29 is secured to the opposite end of the tubular shaft 27 and is adapted to rotate therewith. A rod 31 has the forward portion thereof secured to the crank arm 28 by means of a pivot pin 30 and has the rear end thereof slidably carried by the ear 58.

A cam follower 61 is mounted on the rod 31 in engagement with the cam 36 so that the rod 31 will be caused to reciprocate forwardly and rearwardly in the body 10 upon rotation of the cam 36. A spring mount 62 is secured to the terminal end of the rod 31 and a second spring mount 63 is secured to the side wall 56 at the rear end portion thereof, and a tension spring 33 is secured to and extends between the spring mounts 62 and 63 normally biasing the rod 31 forwardly into engagement with the cam 36.

A rod 32 extends longitudinally of the body 10 and has the forward terminal end thereof pivotally secured to the crank arm 29 by means of pivot pin 30'. The rear portion of the rod 32 is slidably carried by the ear 59 and has mounted on the terminal end thereof a spring mount 64.

A spring mount 65 is secured to the outer end of the ear 59 and a tension spring 34 extends therebetween normally biasing the rod 32 forwardly in the body 10. A cam follower 66 is mounted on the rod 32 and engages the cam 38 so that longitudinally reciprocal movement will be imparted to the rod 32 upon rotation of the cam 38.

In the use and operation of the invention, the motor 42 receives electricity from an elongated control cable (not shown) and rotates the shaft 39, driving the propeller 46 to move the decoy through the water and simultaneously rotating the shaft 37 through the gears 40, 41, 50, 51, 52 and 53, and thereby rotating the cam plates 36 and 38.

The cam followers 61 and 66 being held in engagement with the cam plates 36 and 38, respectively, by means of the springs 33 and 34, causes the rods 31 and 32 to reciprocate in accordance with the patterns formed on the cam plates 36 and 38. The reciprocation of the rod 31 will rotate the crank arm 28 thus rotating the shaft 17 through the flexible cable 25 so that the head 21 will move in an oscillating manner about the axis of the shaft 17.

The movement of the head 21 about the shaft 17 is relatively slight imitating the normal movement of the head of a duck. Reciprocation of the rod 32 will cause an oscillation of the crank arm 29 so as to partially rotate the shaft 27 and the neck 12 carried thereby. Partial rotation of the neck 12 about the axis of the shaft 27 will cause the head 21 to dip into the water on which the decoy is floating simulating a feeding duck.

It will thus be seen that there is herein provided an extremely realistic and life like decoy for all forms of wild life which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a decoy water fowl, a body having a vertically extending bifurcation at the forward end thereof, a neck positioned in said bifurcation means mounting said neck on said body for movement about a transverse horizontal axis, a head pivotally mounted on said neck, motor means in said body, means operatively connected with said motor means and said neck for moving said neck about said horizontal axis to simulate feeding of a water fowl, propeller means operatively connected with said motor for moving said decoy forwardly, and means operatively connected with said motor means and said head for simultaneously oscillating said head from side to side on said neck.

2. In a decoy water fowl, a body having a vertical bifurcation extending rearwardly from the forward end thereof, a neck positioned in said bifurcation means mounting said neck on said body for movement about a transverse horizontal axis, a head pivotally mounted on said neck, motor means in said body, means operatively connected with said motor means and said neck for moving said neck about said horizontal axis to simulate feeding of a water fowl, propeller means operatively connected with said motor for moving said decoy forwardly, and means in said body operatively connected to said motor and head for simultaneously oscillating said head from side to side, said last-mentioned means including a cam actuated by said motor.

3. In a decoy water fowl, a body having a longitudinal bifurcation formed in the forward end thereof, a neck, means mounting said neck in the bifurcation in said body for pivotal movement therein about a transverse horizontal axis, a head pivotally mounted on said neck, motor means in said body, means operatively connected with said motor means and said mounting means for moving said neck about said horizontal axis to simulate feeding of a water fowl, propeller means operatively connected with said motor for moving said decoy forwardly, and means in said body for simultaneously oscillating said head from side to side.

4. A decoy water fowl comprising a body having a recess in the front portion thereof, a neck shaped to conform to said recess, horizontal means pivotally mounting said neck to said body in said recess, a head, means pivotally supporting said head on said neck, and power means for simultaneously moving said neck on said body, dipping said head into the water and turning said head on said neck.

5. A device as claimed in claim 4, wherein means are provided in operative association with said power means in said body for moving the decoy water fowl forwardly.

6. A device as claimed in claim 4, wherein the power means includes a cam actuated lever for pivotally moving said neck on said body.

7. A device as claimed in claim 4, wherein the power means includes a cam actuated lever for pivotally moving said neck on said body, and a second cam actuated lever for turning said head on said neck.

8. A device as claimed in claim 4, wherein said power means includes a motor, and means simultaneously driven by said motor for propelling said decoy water fowl forwardly.

References Cited in the file of this patent
UNITED STATES PATENTS

| | | |
|---|---|---|
| 326,997 | Littleton et al. | Sept. 29, 1885 |
| 1,110,245 | Vaughan | Sept. 8, 1914 |
| 2,174,211 | Hutaff | Sept. 26, 1939 |
| 2,480,390 | Thompson | Aug. 30, 1949 |